May 18, 1937. C. GEISSEN 2,081,007

RAILWAY TRAIN CHASSIS

Filed June 5, 1935

Inventor:
Carl Geissen
By Bartlett, Eyre, Scott & Keel
attys.

Patented May 18, 1937

2,081,007

UNITED STATES PATENT OFFICE 2,081,007

RAILWAY TRAIN CHASSIS

Carl Geissen, Berlin, Germany

Application June 5, 1935, Serial No. 25,056
In Germany November 2, 1931

11 Claims. (Cl. 105—176)

This invention relates to railway cars.

The axle spacing of railroad cars is limited where fixed, non-adjustable axles are used, because curves of the track need to be taken into account in the design. This spacing amounts at the most, for example, to 4.5 metres, according to the building and operation regulations of the German State Railways, so that with longer cars one is forced to use trucks or bogies, or to adopt the so-called association (German Railroad Association) flexible axle, which, because of the conical form of the wheel tires and the play given through the construction of the axle mounting, can adjust itself to the existing curve of the track. The latter is often the only practicable solution, as for example where, for the purpose of diminishing the installation costs or for the purpose of lessening the number of axles, in the construction of light railroad cars for example, trucks, which moreover require heavy truck or bogie frames because of their central loading, must be eliminated. However, because of the play that exists in the construction of the axle mounting of this association axle and because of the imperfect steering or guidance, a peculiar rolling motion often occurs, which causes the car to run unevenly.

One object of the invention is a railroad car or train embodying the association axle or axles and the like wherein the objectionable rolling motion and other disadvantages of that type are obviated.

A further object is a car characterized by its light weight, the even and smooth running thereof, and the low cost of manufacture and installation.

For a better understanding of the invention and further objects thereof reference may be had to the accompanying drawing which forms a part of this application, wherein—

Figure 1:
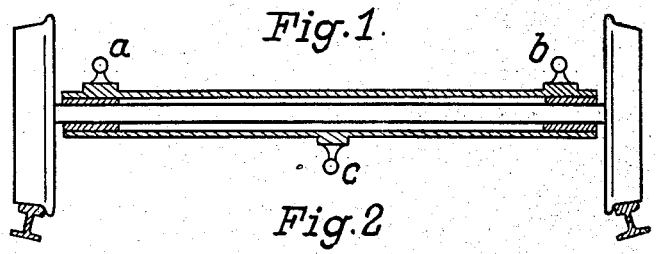
Fig. 1 shows a railroad car axle with its axle housing to which one embodiment of the invention is applied.
Figure 2:
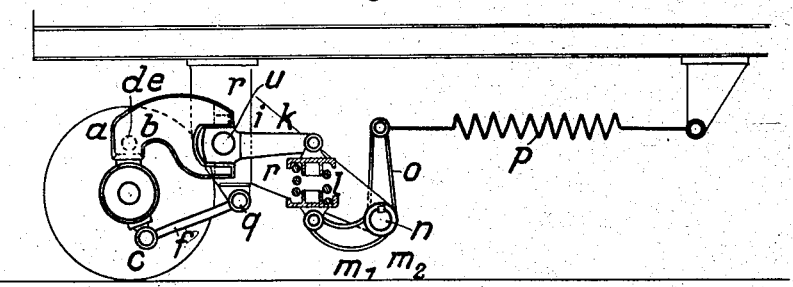
Fig. 2 is a side view of the axle and its steering and spring connections with the frame.
Figure 3:
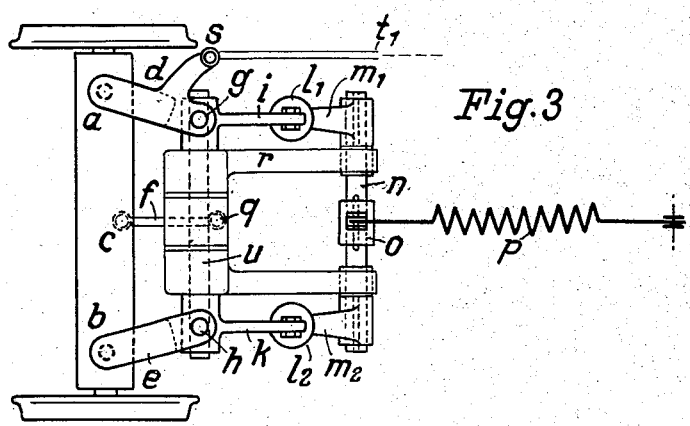
Fig. 3 is a plan view thereof.
Figure 4:
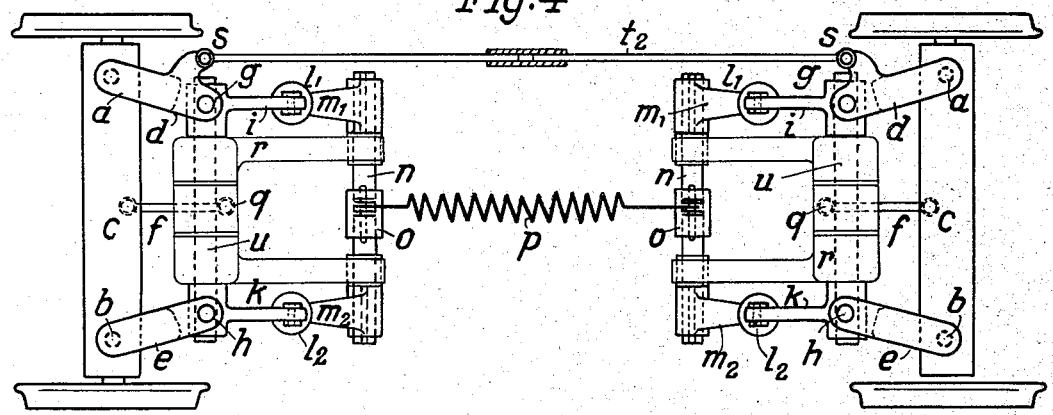
Fig. 4 is a plan view showing the connection of two axle arrangements into one truck or bogie.

Referring to the drawing, an axle is shown having the conventional axle housing. Two supporting levers or members $d$, $e$ and a guide arm or member $f$ are connected at one end to three points $a$, $b$, $c$ of the housing respectively, by universal joints or joints that permit motion in all directions. The points $a$, $b$ lie in the vertical central plane of the axle and the point $c$ lies outside the straight line that connects $a$ and $b$. The other ends of the supporter levers $d$ and $e$ are pivotally connected by means of universal joints $g$, $h$ to a connecting shaft $u$ which is mounted stationarily in car frame $r$, while the other end of the guide piece $f$ is connected by means of a universal joint $q$ with the frame $r$. The vertical rotating movement of the supporter levers $d$, $e$ is, by means of levers $i$, $k$ which are rigidly connected to them in a vertical plane, transmitted in this direction of rotation to the stiff springs $l_1$, $l_2$, the latter resting upon and being supported by the free ends of levers $m_1$, $m_2$, whose other ends are fastened to a connecting shaft $n$ which is pivotally mounted in the car frame. Another lever $o$, which is attached at one end to the shaft $n$, is attached at its upper end to a spring $p$ which may be a soft or easy spring in certain circumstances. The free end of spring $p$ is attached to the frame at $x$ or, according to Fig. 4, is connected to the corresponding spring $p$ of the neighboring axle or to the lever $o$ of that axle mechanism. The steering of the axle takes place through a steering rod $t_1$, which is, on the one hand, connected at $s$ to one of the supporter levers, $d$ for example, and which, on the other hand, is connected to a steering device which, for convenience in illustration, is omitted. According to the arrangement of Fig. 4, where two axle mechanisms are connected with each other, a connecting rod $t_2$ connects the axles through universal joints at points $s$ of corresponding supporter levers $d$ on the same side of the car. The attachment points $s$ may also be located on the members $e$ or guides $f$ and for the purpose of eliminating compression stresses, steering rods may be used on each side, instead of the one steering rod $t_2$. If it be desired to absorb the lateral forces between wheel and rail in an elastic manner, the steering rod $t$ may have more or less stiff springing incorporated in its longitudinal direction.

The following is a description of the operation: A deflection of the axles, on curves for example, is made possible through the supporter levers $d$, $e$, and steering in the desired direction is made possible in accordance with the length and angular inclination of this lever. The spring mechanism does not necessarily come into play when there is merely a deflection of the axles on a curve. When there is, on the other hand, a lateral inclination of the car, the torsional moment that thereby occurs is transmitted by means of levers $d$, $e$ and levers $i$, $k$ to the stiff springs $l_1$, $l_2$. Vertical shocks on the other hand are mainly transmitted on from the stiff springs through the levers $m_1$, $m_2$, connection shaft $n$, and lever $o$, to the spring $p$.

This arrangement of springs results in the shocks which originate from the unevenness of the track being absorbed mainly by spring $p$, while the forces which tend to displace the car center of gravity laterally work upon the stiff springs $l_1$, $l_2$. The guide piece or arm $f$ insures that the position of the axle housing is maintained in the longitudinal direction of the car. If the wheels are not attached rigidly to the axles, but are mounted rotatably upon the axles, then the attachment points $a$, $b$, $c$ and preferably disposed directly upon the axle.

The disadvantages and objectionable features of prior car constructions are thus obviated by the attachment to the axle housing, or to the axle on the one hand and to the frame on the other where loose wheels are used, of two supporter levers and a guide member which is not located in the same plane as the supporter levers, movable in all directions, and through the fact that the supporter levers, which determine the lateral shift or displacement of the axles, transmit to stiff springs by means of pivotally mounted levers torsional moment caused by the shift in weight, while the guide member properly orients or maintains the axle in the longitudinal direction of the car. As a result of this arrangement, and at a certain lateral deflection or deviation, on curves of the track for example, the axles will occupy a certain determined angular position relatively to their original position. The two supporter levers which determine the lateral deflection or deviation of the axles and the straight lines lying in one plane which connect their end points may for example form a trapezium, whereby rapid angular change in the axle position is obtained. The stiff springs, to which the supporter levers transmit the torsional moment caused by the shift in weight, are for their part suitably supported by means of levers mounted upon a shaft which is pivotally attached to the car frame. To this shaft there is attached another lever, which is connected to another spring, the end of which may be adjustably connected to the frame. This spring serves to take up the vertical shocks that affect the axle. The steering of the individual axles takes place through a rod which is attached to one of the supporter levers and which runs to any kind of steering device, one for example which is dependent upon the angular position of two neighboring cars. The rod may moreover be constructed with a spring action for the purpose of absorbing lateral shocks between the wheels and the rails.

If two neighboring axle arrangements and spring systems of the above type are disposed symmetrically opposite to each other in plan view (Fig. 4), it is preferable that the supporter levers which determine the lateral deflection of the axles act through the stiff springs upon a common spring. With such a disposition, it is moreover advantageous to couple one supporter lever of the one axle system with the corresponding supporter lever of the other axle system, so that when there is not too great separation of these two axles their motions correspond approximately to the usual motion of a truck or bogie, without however necessitating the employment of a truck or bogie, which is undesirable in light construction on account of its weight.

I claim:

1. In railway cars of light construction, a car frame, an axle, a pair of supporting levers attached at one end to the axle by means of universal joints, said levers determining the lateral shift or displacement of the axle, a second pair of pivotally mounted levers for transmitting torsional moments upon the first pair and a pair of stiff springs engaging said second pair of levers and resisting said torsional moments caused by a shift in weight and a guide member which is disposed out of the plane of the levers, said guide member having universal connections both with the axle and the car frame for maintaining the axle in the longitudinal direction, the two pairs of supporter levers of symmetrically opposite adjacent axle mechanisms being coupled together for steering movement in unison, and a common spring mechanism for absorbing vertical shocks being acted upon by said pairs of supporting levers.

2. In railway cars of light construction, a car frame, an axle, a pair of supporting levers attached at one end to the axle by means of universal joints, said levers determining the lateral shift or displacement of the axle, a second pair of pivotally mounted levers for transmitting torsional moments upon the first pair and a pair of stiff springs engaging said second pair of levers and resisting said torsional moments caused by a shift in weight and a guide member which is disposed out of the plane of the levers, said guide member having universal connections both with the axle and the car frame for maintaining the axle in the longitudinal direction, the supporting levers of symmetrically opposite adjacent axle mechanisms being coupled together so that the motion of both coupled axles corresponds approximately to the usual motion of a truck or bogie.

3. In a structure of the character set forth, a car frame, a pair of supporter levers pivotally mounted on the frame at points on opposite sides of the longitudinal central axis, a car axle attached to said levers at one end by universal joints, torsion resisting springs engaging the other ends of the levers, said springs being supported by levers fixed at one end to a pivotally mounted shaft and a spring tending to rotate the shaft and to oppose the vertical swinging movements of the levers, a steering rod connecting one of the levers with the lever of a neighboring axle mechanism, and a spring mechanism being incorporated in the steering connections.

4. In a structure of the character set forth, a car frame, a car axle, a pair of levers universally connected at one end with the axle, said levers being inclined inwardly and having universal connections with the car frame, means for yieldingly resisting torsion upon the levers due to rolling movement of the car body comprising springs engaging the levers on the opposite side of the frame connections from the axle connections and means for yieldingly absorbing the vertical shocks, including a steering device connected with the levers.

5. In a railway car, a car frame, two wheel-axles, an axle mechanism for each axle comprising a pair of transmitting levers pivotally mounted in the car frame so as to swing in vertical planes, a pair of supporting levers, one end of each supporting lever being attached to the axle by means of a universal joint, the other ends of the supporting levers having operative connections transmitting vertical axle movements to the transmitting levers and permitting movements of the supporting levers with respect to the transmitting levers only in the horizontal plane, a guide member having universal connections both with the axle and the car frame for positioning the axle in the longitudinal direction, yielding means operatively connected with and yieldingly resisting the movements of the transmitting levers, and means for coupling the two axle mechanisms together for steering motion in unison corresponding approximately to the usual motion of a bogie.

6. In a railway car of the character set forth in claim 5 wherein the said coupling means comprises a rod connecting one supporting lever of one axle mechanism to a supporting lever of the other axle-mechanism.

7. In a railway car of the character set forth in claim 5 wherein the said yielding means comprises a spring device common to both axle mechanisms.

8. In a railway car, a car frame, two wheel-axles, an axle mechanism for each axle comprising a pair of transmitting levers pivotally mounted in the car frame so as to swing in vertical planes, a pair of supporting levers, one end of each supporting lever being attached to the axle by means of a universal joint, the other ends of the supporting levers having operative connections transmitting vertical axle movements to the transmitting levers and permitting movements of the supporting levers with respect to the transmitting lever only in the horizontal plane, a guide member having universal connections both with the axle and the car frame for positioning the axle in the longitudinal direction, means operatively engaged by the ends of the transmitting levers for yieldingly resisting the torsional moments transmitted by the said levers, and means for coupling the two axle-mechanisms together for steering motion in unison corresponding approximately to the usual motion of a bogie, and means common to the two axle mechanisms adapted to absorb the vertical shocks between the wheels and the rails.

9. In a railway car, a car frame, two wheel-axles, an axle mechanism for each axle comprising a pair of transmitting levers pivotally mounted in the car frame so as to swing in vertical planes, a pair of supporting levers, one end of each supporting lever being attached to the axle by means of a universal joint, the other end of each supporting lever being attached to one said transmitting lever by means of a connection which permits a movement of the supporting lever with respect to the transmitting lever only in the horizontal plane, a guide member having universal connections both with the axle and the car frame for positioning the axle in the longitudinal direction, means pivotally mounted in the car frame so as to swing in a vertical plane, means interposed between said means and said transmitting levers for resisting the vertical movements transmitted by the transmitting lever, yielding means engaging said first named means of each axle mechanism and adapted to yieldingly absorb the vertical shocks between the wheels and the rails, and a coupling connecting the two-axle mechanisms together for steering motion in unison corresponding approximately to the usual motion of a bogie.

10. In a railway car, a car frame, a wheel-axle, an axle mechanism comprising a pair of transmitting levers pivotally mounted in the car frame so as to swing in vertical planes, a pair of supporting levers, one end of each supporting lever being attached to the axle by means of a universal joint, the other end of each supporting lever being operatively attached to one said transmitting lever by means of a connection which permits a movement of the supporting lever with respect to the transmitting lever only in the horizontal plane, a guide member having universal connections both with the axle and the car frame for positioning the axle in the longitudinal direction, yielding means operatively connected with and yieldingly resisting the movements of the said transmitting levers and a steering device directly connected with an element of said axle mechanism.

11. In a railway car, a car frame, a wheel-axle, an axle mechanism comprising a pair of transmitting levers pivotally mounted in the car frame so as to swing in vertical planes, a pair of supporting levers, one end of each supporting lever being attached to the axle by means of a universal joint, the other of each supporting lever being operatively attached to one of said transmitting levers by means of a connection which permits a movement of the supporting lever with respect to the transmitting lever only in the horizontal plane, yielding means operatively engaged by said transmitting levers for resisting torsional moments, yielding means including operative connections for resisting vertical shocks, a guide member having universal connections both with the axle and the car frame for positioning the axle in the longitudinal direction and a steering device directly connected with an element of said axle mechanism.

CARL GEISSEN.